United States Patent
Kikuchi et al.

(10) Patent No.: US 8,629,935 B2
(45) Date of Patent: Jan. 14, 2014

(54) SOLID-STATE IMAGING DEVICE AND IMAGING APPARATUS

(75) Inventors: Masaru Kikuchi, Kanagawa (JP); Hayato Wakabayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 805 days.

(21) Appl. No.: 11/944,829

(22) Filed: Nov. 26, 2007

(65) Prior Publication Data

US 2008/0122941 A1    May 29, 2008

(30) Foreign Application Priority Data

Nov. 29, 2006   (JP) ................................. 2006-321432

(51) Int. Cl.
*H04N 5/225*    (2006.01)
*H04N 5/217*    (2011.01)
*H04N 5/335*    (2011.01)

(52) U.S. Cl.
USPC ............ 348/372; 348/241; 348/294; 348/308

(58) Field of Classification Search
USPC ......... 348/294, 300, 301, 302, 303, 304, 307, 348/308, 241, 243, 251, 372
See application file for complete search history.

(56) References Cited

U.S. PATENT DOCUMENTS

| 6,204,721 B1 * | 3/2001 | Yuen et al. ..................... 327/534 |
| 6,323,722 B1 * | 11/2001 | Proebsting ..................... 327/536 |
| 6,624,456 B2 * | 9/2003 | Fossum et al. ................. 257/292 |
| 7,259,790 B2 * | 8/2007 | Mabuchi et al. .............. 348/310 |
| 7,362,163 B1 * | 4/2008 | Raghavan ...................... 327/536 |
| 2003/0081136 A1 * | 5/2003 | Kobayashi .................. 348/333.1 |
| 2007/0205824 A1 * | 9/2007 | Perisetty ........................ 327/536 |
| 2007/0272828 A1 * | 11/2007 | Xu ............................. 250/208.1 |
| 2007/0285961 A1 * | 12/2007 | Park .............................. 365/129 |

FOREIGN PATENT DOCUMENTS

| JP | 06-351229 | 12/1994 |
| JP | 2000-312471 | 7/2000 |
| JP | 2000-270540 | 9/2000 |
| JP | 2000-324806 | 11/2000 |
| JP | 2002-217397 | 8/2002 |
| JP | 2002-291231 | 10/2002 |
| JP | 2003-131629 | 5/2003 |
| JP | 2006-216147 | 8/2006 |
| JP | 2006-319684 | 11/2006 |

OTHER PUBLICATIONS

A Japanese Office Action dated Oct. 22, 2008 issued in connection with counterpart Japanese Patent Application No. 2006-321432.

* cited by examiner

*Primary Examiner* — Lin Ye
*Assistant Examiner* — Peter Chon
(74) *Attorney, Agent, or Firm* — Dentons US LLP

(57) ABSTRACT

A solid-state imaging device includes plural photoelectric conversion means arranged along light receiving surfaces, readout means for reading out signal charge generated in the photoelectric conversion means, a voltage supply means for supplying various levels of voltages to respective units including the photoelectric conversion means and the readout means, a detection means for detecting level change of a prescribed supply voltage in supply voltages by the voltage supply means and a control means for controlling so that the level change is converged when level change of the prescribed supply voltage is detected by the detection means.

12 Claims, 19 Drawing Sheets

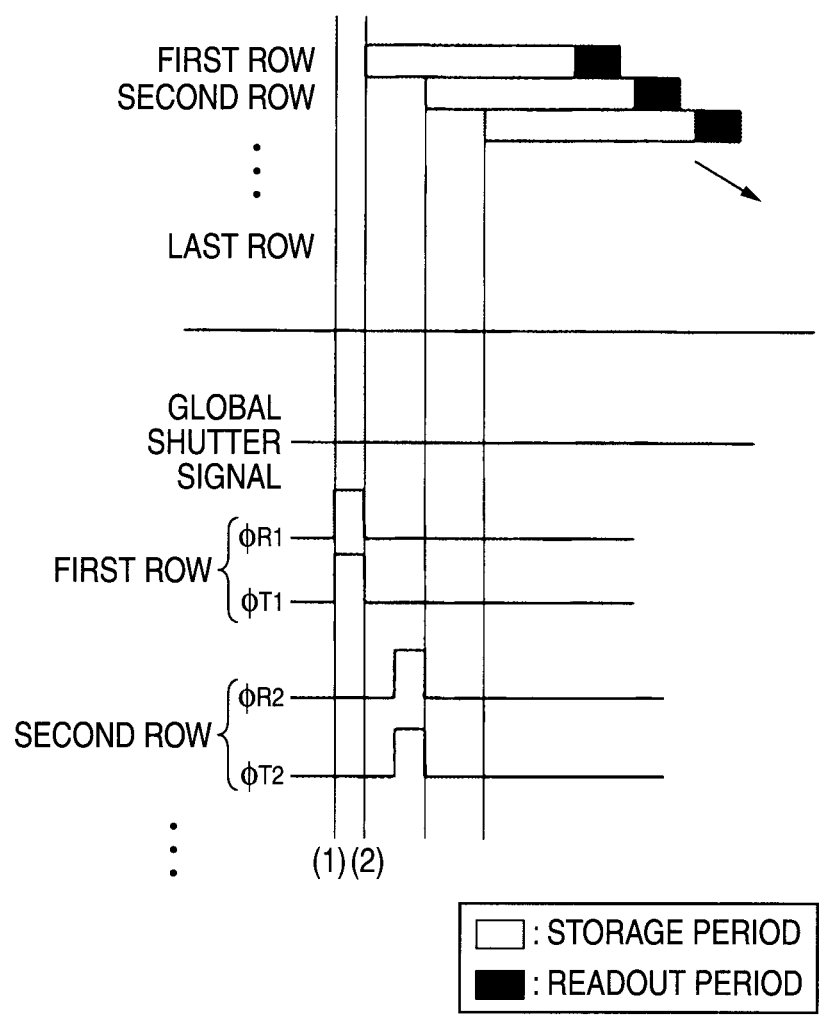

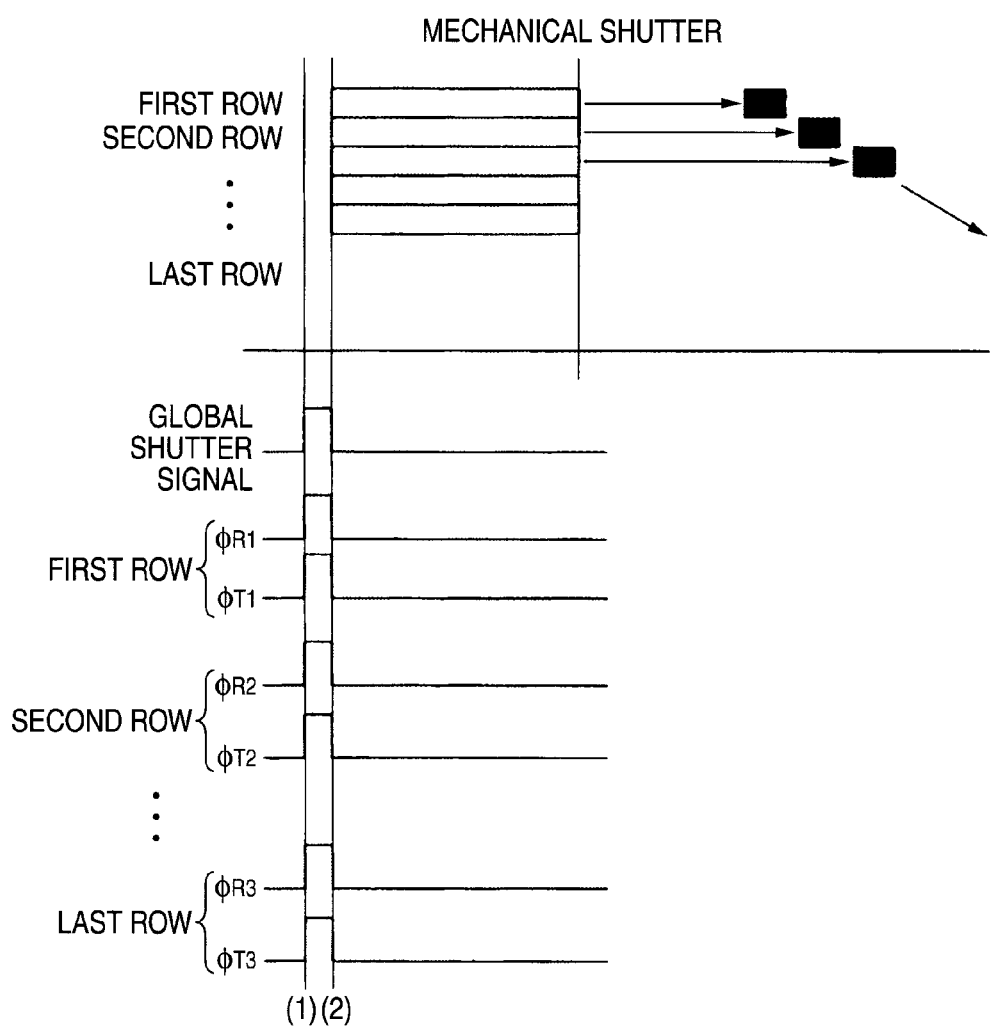

⇩

SOLID-STATE IMAGING DEVICE AND IMAGING APPARATUS

CROSS REFERENCE TO RELATED APPLICATIONS

The present invention contains subject matter related to Japanese Patent Application JP 2006-321432 filed in the Japanese Patent Office on Nov. 29, 2006, the entire contents of which being incorporated herein by reference.

BACKGROUND OF THE INVENTION

1. Field of the Invention

The invention relates to a solid-state imaging device used for various image sensors, particularly, relates to a solid-state imaging device and an imaging apparatus capable of securing efficient operation with respect to load changes at the time of activation and other occasions.

2. Description of the Related Art

In related arts, a MOS-type solid-state imaging device is known as this kind of solid-state imaging device. In the MOS-type solid-state imaging devices, a solid-state imaging device having a system in which signal charge of a photodiode (photoelectric converter) included in a pixel is read out after the charge is transferred to a detection region using a transfer transistor is known.

The MOS-type solid-state imaging device having this system is different from a CCD-type solid-state imaging device, in which a CMOS logic circuit is mounted on the same chip, and pixels are operated by one power source of low voltage which is the same as the logic circuit. Therefore, for example, when the transfer transistor is an n-channel MOS transistor, gate voltage of the transfer transistor in the pixel had two values of 0V and a power supply voltage Vdd. In related arts, negative voltage is applied to the gate of the transfer transistor in order to prevent dark current, thereby achieving improvement of image quality (for example, refer to JP-A-2002-217397 (Patent Document 1)).

FIG. 10 is a circuit diagram showing an example of a MOS-type solid-state imaging device in the related art.

A MOS-solid-state imaging device 1 includes a sensor unit 3 in which plural pixels 2 are arranged in a matrix manner, a vertical scanning circuit 4 and a horizontal scanning circuit 5 driving the sensor unit 3, and signal holding circuits 6 receiving signals of pixels 2 of one row in the sensor unit 3. In FIG. 10, the pixels 2 are drawn as 2×2 pixels for convenience, however, many pixels are actually arranged.

Each pixel 2 includes a photodiode PD performing photoelectric conversion, a transfer transistor QT transferring signal charge of the photodiode PD to a detection region (floating diffusion) FD, an amplifying transistor QA outputting potential at the detection region FD to a vertical signal line 8, an address transistor QD selecting a row of the pixel 2 and a reset transistor QR resetting potential of the detection region FD.

In the pixel 2, a gate of the address transistor QD is connected to a vertical selection line 10 from the vertical scanning circuit 4. A gate of the reset transistor QR is connected to a reset line 11, and a gate of the transfer transistor QT is connected to a vertical readout line 9. A load transistor QL having a function of a constant current source is connected to one end of the vertical signal line 8 and the signal holding circuit 6 is connected to the other end thereof. An output signal of each pixel is taken by the signal holding circuit 6 through the vertical signal line 8 and outputted to a circuit of a sequential stage through an OR gate 15 by driving the horizontal scanning circuit 5.

The vertical scanning circuit 4 is provided with three buffer circuits 12, 13 and 14 at each pixel row. The buffer circuits 12 and 13 output the power supply voltage Vdd to the vertical selection line 10 or the reset line 11 at the output side when a low-level pulse is inputted from the side of the vertical scanning circuit 4 and output ground voltage to the vertical selection line 10 or the reset line 11 at the output side when a high-level pulse is inputted.

In this example, a negative voltage generating circuit 7 (for example, a charge pump circuit) is provided as a means for applying negative voltage to the gate of the transfer transistor QT during a charge storage period. The output of the negative voltage generating circuit 7 is inputted to the buffer circuit 14 connected to the vertical readout line 9.

The buffer circuit 14 outputs the power supply voltage Vdd to the vertical readout line 9 at the output side when a low-level pulse is inputted from the side of the vertical scanning circuit 4 and outputs negative voltage to the vertical readout line 9 at the outside side when a high-level pulse is inputted.

Next, shutter operation in the above MOS-type solid-state imaging device 1 is shown in FIG. 11A and FIG. 11B. The operation is divided into a charge storage period and a readout period. All pixels in the same row are processed at the same timing. There are a normal shutter mode (FIG. 11A) in which storage and readout are performed by each row with continuous operation and the charge is outputted for the number of rows, and a global shutter mode (FIG. 11B) in which, after charge storage of all pixels are performed, readout is performed at each row. In FIG. 11A and FIG. 11B, a reset gate signal is denoted as $\phi R$, and a transfer gate signal is denoted as $\phi T$.

In the normal shutter mode (FIG. 11A), first, the photodiode PD and the detection region FD are reset, then, charge storage is started. During the readout period after charge storage is finished, signal charge stored in the photodiode PD is transferred to the detection region FD, signal voltage corresponding to the FD is transmitted to the signal holding circuit 6 by a source follower including the amplifying transistor QA and the load transistor QL. In the global shutter mode, reset is performed by turning on a global shutter signal, and charge storage of all pixels is performed at the same time by turning off the global shutter signal, then, charge storage of all pixels is finished at the same time by a mechanical shutter. The readout period after that is the same as the control sequence of the normal shutter for one row, and this sequence is repeated for the number of rows to output signals of all pixels.

Next, a boosting charge pump circuit in the related art is shown in FIG. 12 (for example, refer to JP-A-6-351229 (Patent Document 2)).

As shown in the drawing, the charge pump circuit includes an oscillation circuit 201, an amplifier 202, a reference voltage source 203, switches SW1 to SW4, voltage-dividing resistances R1, R2, a pump capacitor (pump capacitance) Cp, an output capacitor $C_{OUT}$, an inverter 204 and the like. A power supply voltage Va by the amplifier 202 is applied to both ends of the pump capacitor Cp through the switches SW1, SW4, and one end of the pump capacitor Cp is connected to the output capacitor $C_{OUT}$ through the switch SW2 and the other end is grounded through the switch SW3.

Then, charge from the amplifier 202 is charged in the pump capacitor Cp by the oscillation circuit 201, the inverter 204 and switching operation by the switches SW1 to SW4, and the boosted output is smoothed at the output capacitor $C_{OUT}$ to be outputted as an output voltage $V_{OUT}$.

In this circuit, the output voltage $V_{OUT}$ is divided by the resistances R1, R2, and the divided voltage and a reference voltage $V_{REF1}$ are compared by the amplifier 202, and output voltage Va of the amplifier 202 is used as the power supply for the charge pump circuit to perform boosting operation.

Though the configuration shown in FIG. 12 is a circuit configuration of the boosting charge pump, a feedback system using an inverting charge pump amplifier can also be realized by the similar configuration. The inverting charge pump circuit is shown in FIG. 13. The same signs are put to components common to the FIG. 12.

As shown in the drawing, in this circuit, one end of the pump capacitor Cp is grounded through the switch SW1, and the other end is connected to the drive voltage Vdd through the switch SW3.

Then, new voltage values are set to respective reference voltages, and at first, charge is stored in the pump capacitor Cp by connecting between the Vdd and GND with the switches SW 1 and SW 3 as a sequence of switching. After that, the switch SW4 is connected to the output voltage Va of the amplifier 202 and the reverse end is connected to the switch SW2 to generate negative voltage output $V_{OUT}$.

SUMMARY OF THE INVENTION

However, the related arts shown in FIG. 10 to FIG. 13 respectively have the following problems.

First, concerning a problem of the image sensor shown in FIG. 10, reset operation when charge storage is started to be the problem will be described as follows, focusing on the transfer transistor QT of the pixel 2. FIG. 14 is a timing chart of transfer-gate drive pulses applied to the transfer transistor QT from the vertical readout line.

First, when starting the reset operation, the reset transistor QR and the transfer transistor QT are turned on by signal pulses $\Phi_R$, $\Phi_T$ from the reset line 11 and the vertical readout line 9 from the vertical scanning circuit 4 ((1) in the drawing). The photodiode PD and the detection region FD are reset because dark charge is swept out by the operation. Next, at the point of (2), the reset and transfer pulses $\Phi_R$, $\Phi_T$ are set to the low level, the transfer transistor is turned off and the charge storage is started.

FIG. 15A and FIG. 15B are diagrams showing changes of capacitance load at the time of reset in the charge pump circuit (negative voltage generating circuit). As a specific negative voltage, −1.1V shown in the Patent Document 1 is used in this case.

First, at a point before the reset is started, all load of the transfer gate is connected to the charge pump circuit. At the moment when the transfer-gate drive pulse is set to High, the load capacitance of the transfer gate is separated from the negative voltage generating circuit. At this time, load in the output of the charge pump is reduced and output voltage varies slightly, however, the negative voltage generating circuit is separated from the transfer gate, therefore, the problem affecting images does not occur.

Next, at the point of (2), the transfer-gate drive pulse is set to Low and the reset is finished to start charge storage. At this time, a load capacitance CQT of the transfer gate is connected to the negative voltage generating circuit at a time. The load capacitance at this time is for all pixels in the case of the global shutter mode.

Therefore, in the configuration of FIG. 10, the reset operation before the storage period in the global shutter gives large change of capacitance load (capacitance load for all pixels) to the charge pump circuit, as a result, a value of negative voltage varies. At this time, the negative voltage varies in the direction of a smaller absolute value because the capacitance load increases. The period corresponds to the charge storage period, and it is highly likely to be the image with shading caused by dark current by the voltage change period.

Next, a problem of the charge pump circuit in the related arts is that, for example, a sudden output change is responded only by a time constant determined by a feedback loop in the negative feedback control shown in FIG. 12, and time for recovery is limited depending on a band in the loop. Therefore, at the time of sudden load change, there is a problem that it takes a long time to recover the voltage change by the charge supplied by the capacitor to a stable level.

Also in the inverting charge pump shown in FIG. 13, the similar problem to the charge pump shown in FIG. 12 occurs, that is, it takes a long time until the output voltage returns to the set voltage because the response to the sudden voltage change is limited depending on a band of the amplifier. The operation is shown in FIG. 17.

First, a negative voltage (for example, −1.1V) is applied to the transfer gates of all pixels at the same time as falling of the global shutter signal, the load as the charge pump increases in a moment. Accordingly, output voltage varies because of the movement of charge from the capacitor, and the amplifier 202 operates to decrease the amplifier output Va for supplying charge. Since the output of the amplifier is connected to the switch SW4 in FIG. 13, the low level of a voltage (CB) switching the pump capacitor operates in the same manner as the output change of the amplifier 202. According to the above feedback operation, the output voltage converges to the set value. Since the response of the output voltage follows the response of the amplifier, it is difficult to restore the voltage immediately.

In order to stabilize operation, large capacitance is used for the output capacitor $C_{OUT}$. Therefore, it takes a long time to reach a target voltage from the zero start such as the occasion of switching on or returning from a standby state. The operation is shown in FIG. 16.

The problem of convergence of voltage leads to the delay of negative voltage applied to the transfer transistor being a set voltage, and it is difficult to apply sufficient negative voltage for suppressing dark current, accordingly, a disadvantage of causing shading occurs because the dark current is generated.

As a method of solving the above disadvantage, there is a method of widening the band of the amplifier in FIG. 12 and FIG. 13, however, disadvantages such as deterioration of stability or increase of effects of switching noise adversely occur. It can be considered that the external capacitance is increased as another method of reducing change of output voltage, however, the method generates new problems in aspects of space and costs.

The length of activation time such as the occasion of switching on or returning from a standby state means that the negative voltage is not stabilized for a long time and it is difficult to obtain a good image for a fixed time, therefore, it is difficult to be the standby state positively, which does not contribute to reduced power consumption.

Thus, it is desirable to provide a solid-state imaging device and an imaging apparatus capable of speeding up activation operation and suppressing load change by performing suitable current supply in the occasion of activating the apparatus or in the occasion of sudden load change, thereby realizing speed-up of the operation and low power consumption.

According to an embodiment of the invention, there is provided a solid-state imaging device including plural photoelectric conversion means arranged along light receiving surfaces, readout means for reading out signal charge generated in the photoelectric conversion means, a voltage supply means for supplying various levels of voltages to respective units including the photoelectric conversion means and the readout means, a detection means for detecting level change of a prescribed supply voltage in supply voltages by the voltage supply means, and a control means for controlling so that the level change is converged when level change of the prescribed supply voltage is detected by the detection means.

According to an embodiment of the invention, there is provided an imaging apparatus including a solid-state imaging device for performing imaging of subjects, an imaging optical system focusing subject images at light receiving portions of the solid-state imaging device, a drive control unit driving the imaging optical system, a signal processing unit performing signal processing of output signals from the solid-state imaging device and generating imaging signals, a recording unit recording imaging signals generated by the signal processing unit, an output unit outputting imaging signals generated by the signal processing unit, and an operation unit inputting various signals for controlling imaging operations, in which the solid-state imaging device includes plural photoelectric conversion means arranged along light receiving surfaces, readout means for reading out signal charge generated in the photoelectric conversion means, a voltage supply means for supplying various levels of voltages to respective units including the photoelectric conversion means and the readout means, a detection means for detecting level change of a prescribed supply voltage in supply voltages by the voltage supply means and a control means for controlling so that the level change is converged when level change of the prescribed supply voltage is detected by the detection means.

The solid-state imaging device and the imaging apparatus according an embodiment of the invention detect level change of a prescribed supply voltage by the voltage supply means and performs control so that the level change is converged, therefore, there are advantages such as speed-up at the time of activation or that a sudden load change during operation can be minimum.

Therefore, for example, it is possible to allow the solid-state imaging device to be a stand-by state frequently because of the speed-up of activation, thereby realizing low power consumption of equipment. In addition, as a current supply due to the momentary load change, for example, an external capacitance is used. The current supply ability at the time of sudden load change is increased according to an embodiment of the invention, thereby storing charge to the external capacitance quickly, as a result, it is possible to select a smaller external capacitance and to expect improvement in aspects of costs and layout.

The voltage supply means includes the charge pump circuit having the pump capacitance pumping up charge from amplifier output and the switching circuit performing switching control of the charge-pump operation by the pump capacitance, and the level change of supply voltage is controlled by controlling switching frequency of the charge pump circuit, thereby performing stable voltage supply.

In addition, the control means is allowed to be, for example, a selection circuit switching control signals which control switching frequency of the charge pump circuit, thereby realizing the device with the simple configuration. The control means can be, for example, the voltage control oscillator or the PLL which controls switching frequency of the charge pump circuit, thereby controlling the voltage supply amount with high accuracy and smoothly, or in multistage.

Additionally, the detection means is allowed to be the comparator which compares the supply voltage with the prescribed reference voltage, thereby realizing the device with the simple configuration. The detection means can be also an AD converter which digitalizes the supply voltage, thereby realizing the detection with high accuracy and in multistage.

Note that optimum means can be selected as the above control means and the detection means according to costs or applications.

BRIEF DESCRIPTION OF THE DRAWINGS

FIG. 11A and FIG. 11B are explanatory graphs showing shutter operations of the solid-state imaging device shown in FIG. 10;

DESCRIPTION OF THE PREFERRED EMBODIMENTS

Figure 1:
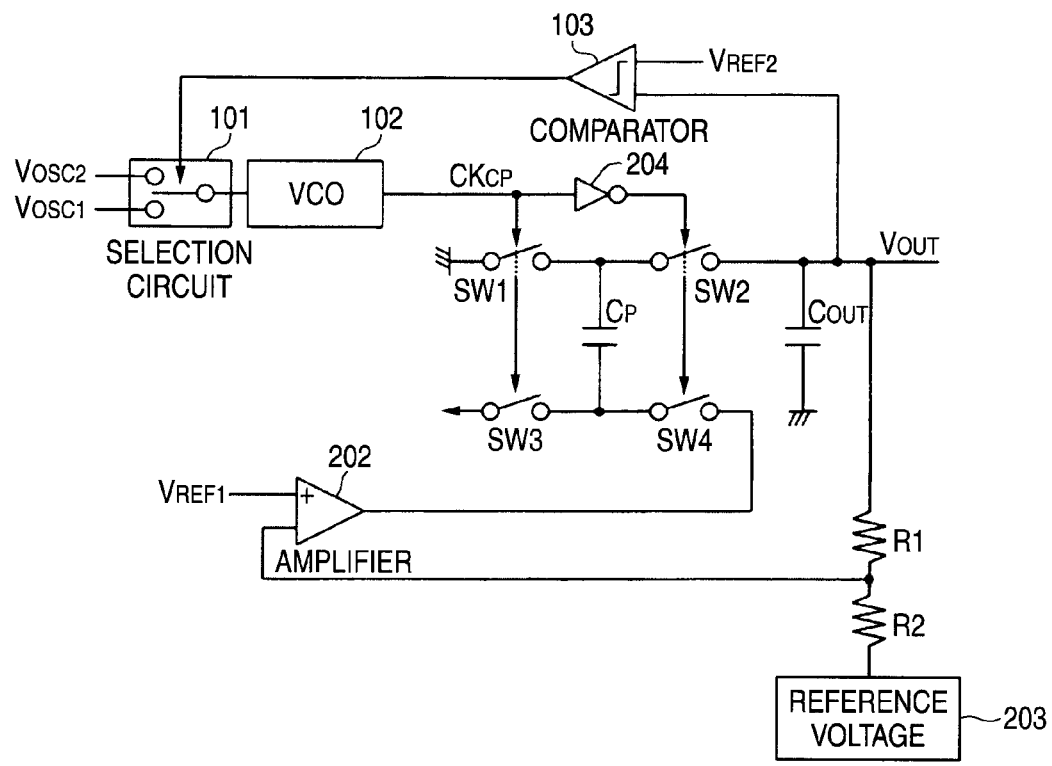
FIG. 1 is a circuit diagram showing a charge pump circuit of a solid-state imaging device according to a first embodiment of the invention.
Figure 10:
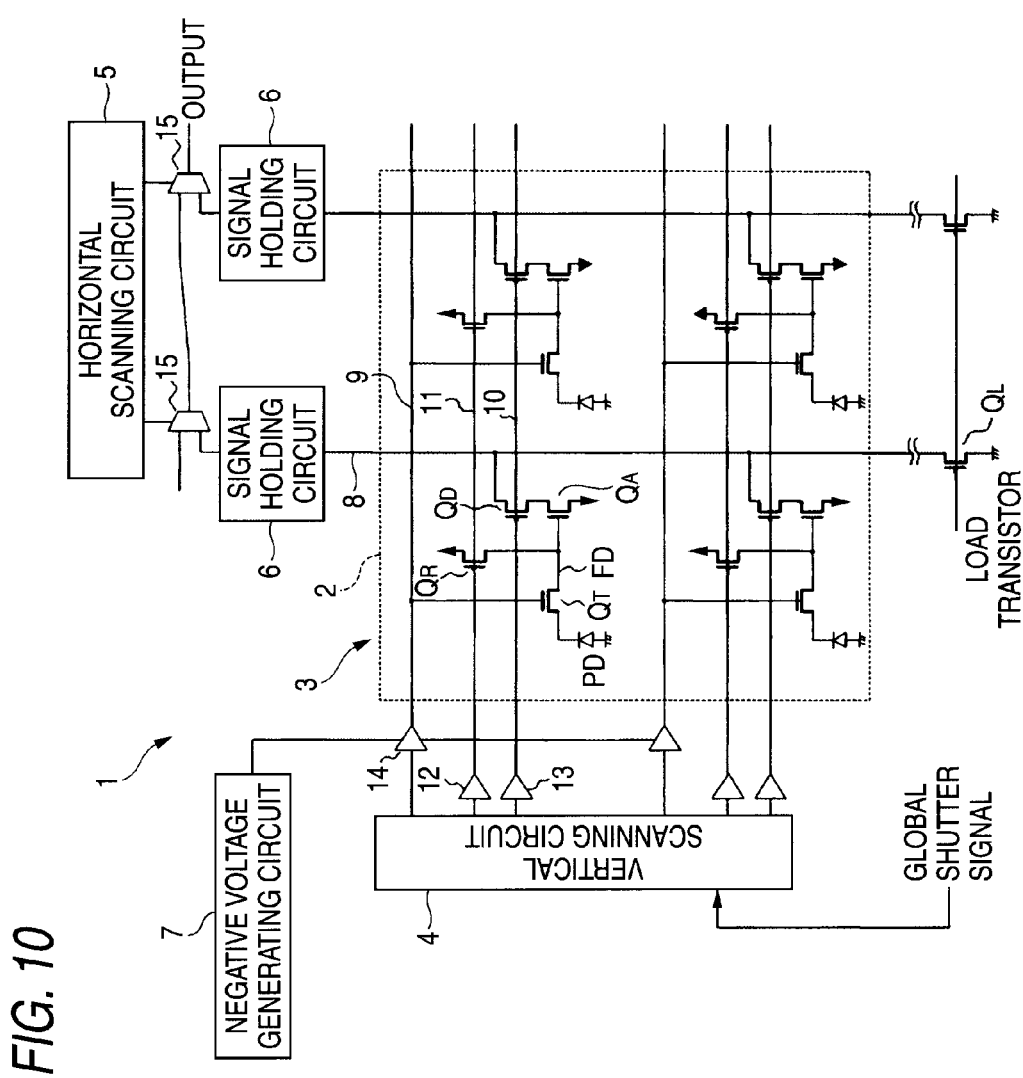
FIG. 10 is a circuit diagram showing a configuration example of a MOS-type solid-state imaging device in the related art.
Figure 12:
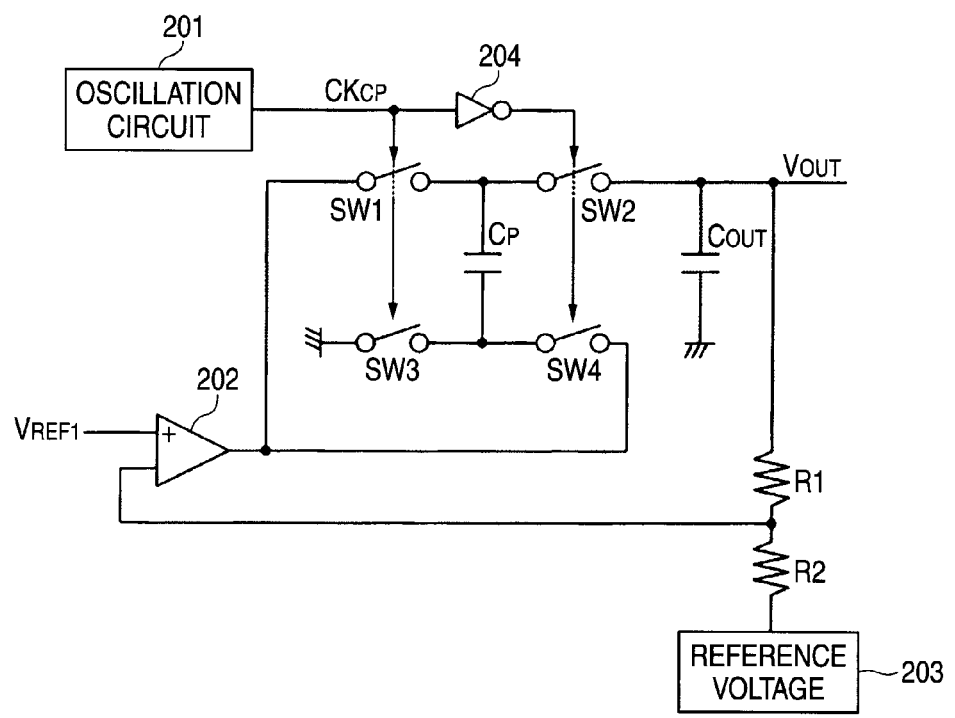
FIG. 12 is a circuit diagram showing a configuration example of a boosting charge pump circuit in the related art.

FIG. 1 is a circuit diagram showing a first embodiment of a negative voltage generating circuit (charge pump circuit) of a solid-state imaging device according to an embodiment of the invention. The whole configuration of the solid-state imaging device is the same as the configuration, for example, shown in FIG. 10, and the explanation thereof is omitted. In FIG. 1, the same signs are put to components common to the related example shown in FIG. 13.

As shown in the drawing, the charge pump circuit includes a selection circuit 101, a voltage control oscillator (VCO) 102, a comparator 103, an amplifier 202, a reference voltage source 203, switches SW1 to SW4, voltage-dividing resistances R1, R2, a pump capacitor Cp, an output capacitor $C_{OUT}$, an inverter 204 and the like.

Figure 13:
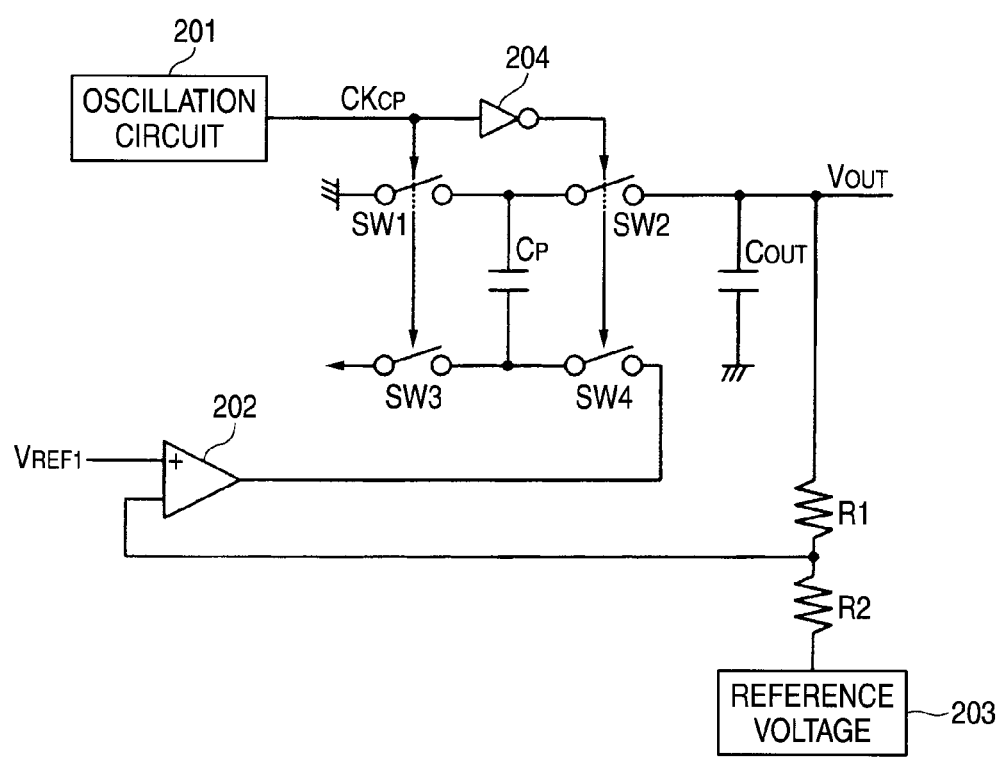
FIG. 13 is a circuit diagram showing a configuration example of an inverting charge pump circuit in the related art.
Figure 14:
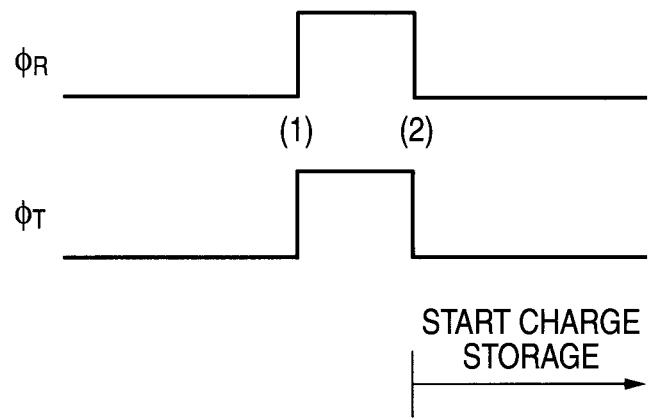
FIG. 14 is an explanatory chart showing transfer gate drive pulse applied to the transfer transistor from a vertical readout line shown in FIG. 10.
Figure 15A:
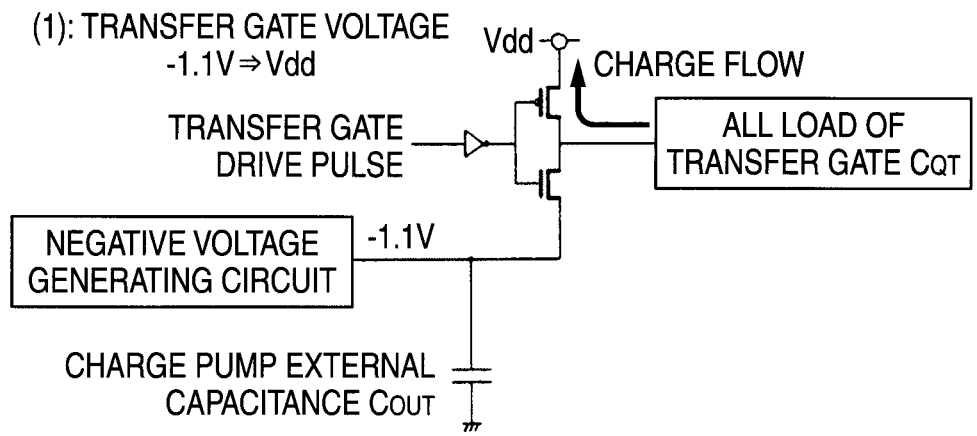
FIG. 15A and FIG. 15B are explanatory diagrams showing capacitance load changes at the time of reset in the charge pump circuit shown in FIG. 13.
Figure 15B:
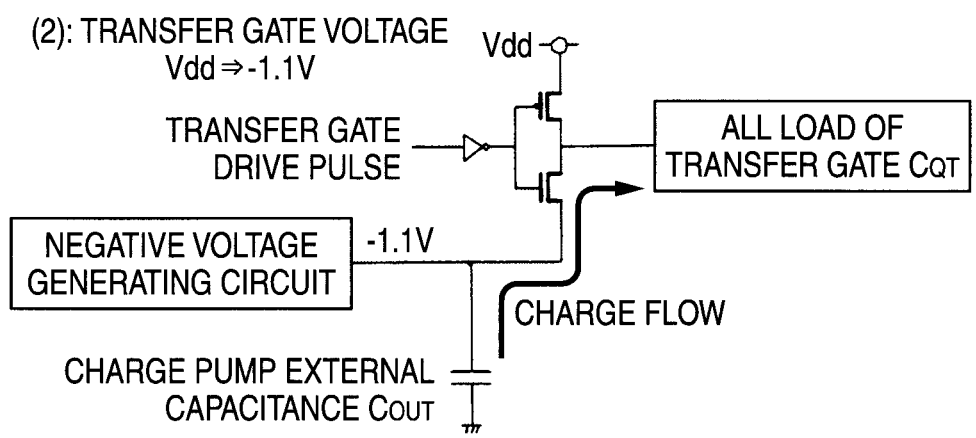
Figure 16:
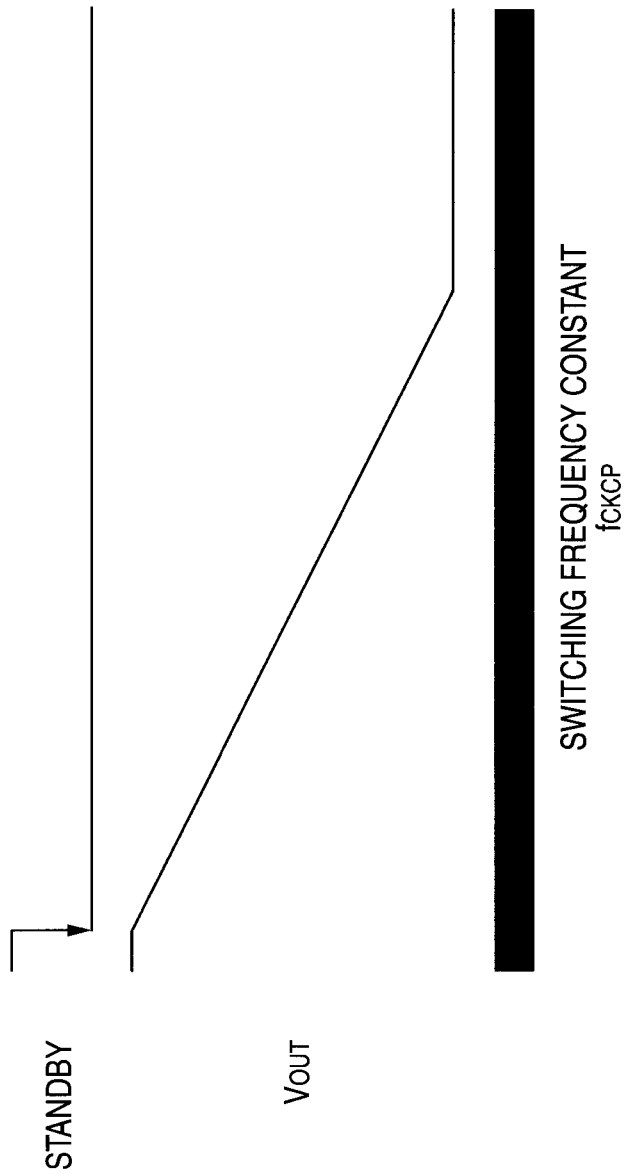
FIG. 16 is an explanatory graph showing operation of the charge pump circuit shown in FIG. 13 at the time of activation.
Figure 17:
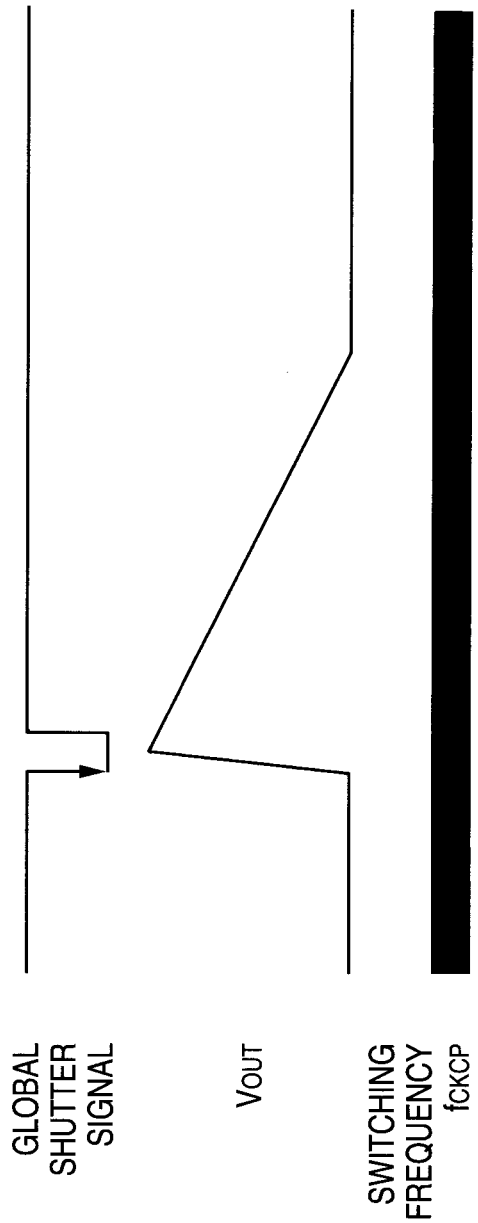
FIG. 17 is an explanatory graph showing operation of the charge pump circuit shown in FIG. 13 at the time of overload.

The operation as the charge pump is performed in the same manner as FIG. 13. First, charge is stored in the pump capacitor Cp by connecting between Vdd and GND by the switches SW1, SW3. After that, a negative voltage output $V_{OUT}$ is generated by connecting the switch SW4 to an output voltage Va of the amplifier 202, and connecting the reverse end to the switch SW2.

In FIG. 1, the selection circuit 101 is a circuit selecting control voltages $V_{OSC1}$, $V_{OSC2}$ to be supplied to the VCO 102 depending on an output signal from the comparator 102.

Figure 2:
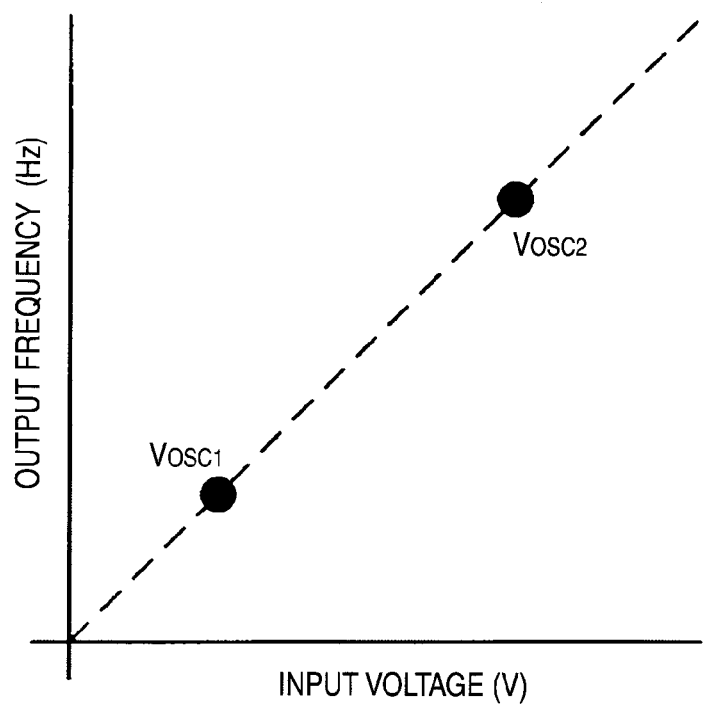
FIG. 2 is an explanatory graph showing input and output characteristics of VCO used for the charge pump circuit shown in FIG. 1.

The VCO 102 inputs control voltages $V_{OSC1}$, $V_{OSC2}$ selected by the selection circuit 101, outputting a signal having an oscillation frequency according to the voltage value and supplying the signal to respective switches SW1 to SW4 and the inverter 204. FIG. 2 is an explanatory graph showing input and output characteristics of VCO 102. As shown in the drawing, output signals having frequencies in relation to the level of the control voltages $V_{OSC1}$, $V_{OSC2}$ are outputted.

The comparator 103 compares the output voltage $V_{OUT}$ of the charge pump with a reference (threshold) voltage $V_{REF2}$, supplying a signal according to the compared result to the selection circuit 101.

Therefore, in this circuit, the oscillation frequency of VCO 102 is switched according to the output voltage $V_{OUT}$ of the charge pump, and respective switches SW1 to SW4 of the charge pump are controlled.

Next, specific operations of the charge pump circuit of the embodiment will be explained.

Figure 3:
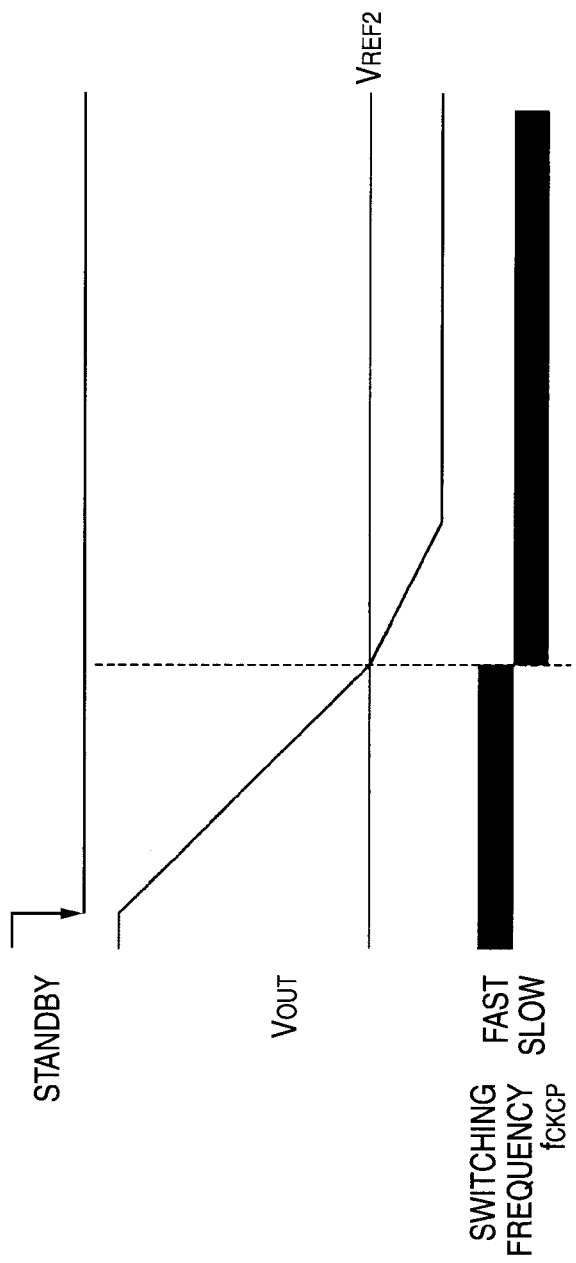
FIG. 3 is an explanatory graph showing operation of the charge pump circuit shown in FIG. 1 at the time of activation.
Figure 4:
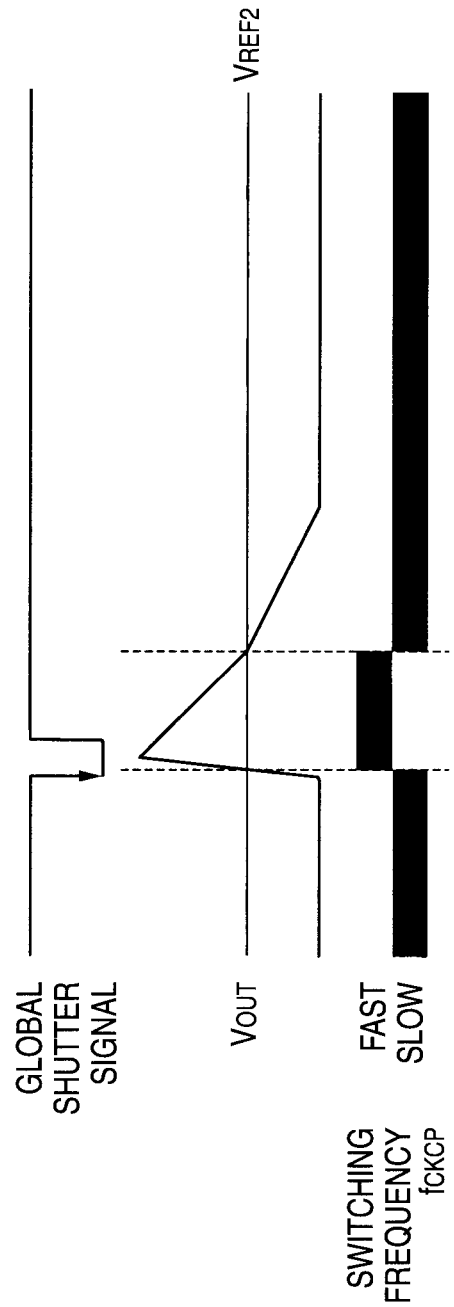
FIG. 4 is an explanatory graph showing operation of the charge pump circuit shown in FIG. 1 at the time of overload.

FIG. 3 and FIG. 4 are explanatory graphs showing operations of the embodiment. FIG. 3 shows the operation at the time of activation and FIG. 4 shows the operation at the time of overload.

First, at the time of activation ($V_{OUT}=0V$) or in the case of a sudden load change (for example, at the time of global shutter), when the output voltage $V_{OUT}$ is at a threshold voltage ($V_{REF2}$) or more, a value of the comparator 103 is outputted so as to select the voltage $V_{OSC2}$ at which the VCO 102 oscillates at high speed.

Then, when the $V_{OUT}$ reaches the threshold voltage ($V_{REF2}$) or less after a certain period of time, the output of the comparator 103 is inverted, the voltage is switched to the voltage $V_{OSC1}$ at which the VCO 102 oscillates at low speed, namely, a mode is switched to a low power consumption mode which attaches importance to the efficiency.

Figure 5:
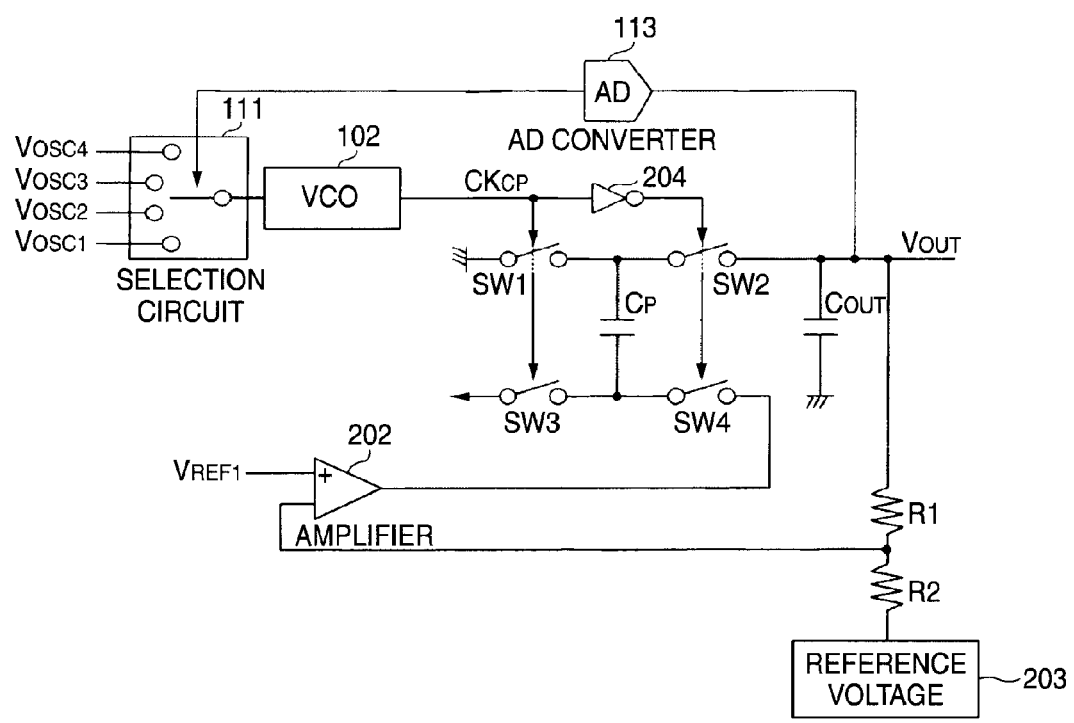
FIG. 5 is a circuit diagram showing a charge pump circuit of a solid-state imaging device according to a second embodiment of the invention.

FIG. 5 is a circuit diagram showing a second embodiment of the charge pump circuit. The whole configuration of the solid-state imaging device is the same as the configuration shown, for example, in FIG. 10, and the explanation thereof is omitted. In FIG. 5, the same signs are put to components common to the embodiment shown in FIG. 1.

Figure 6:
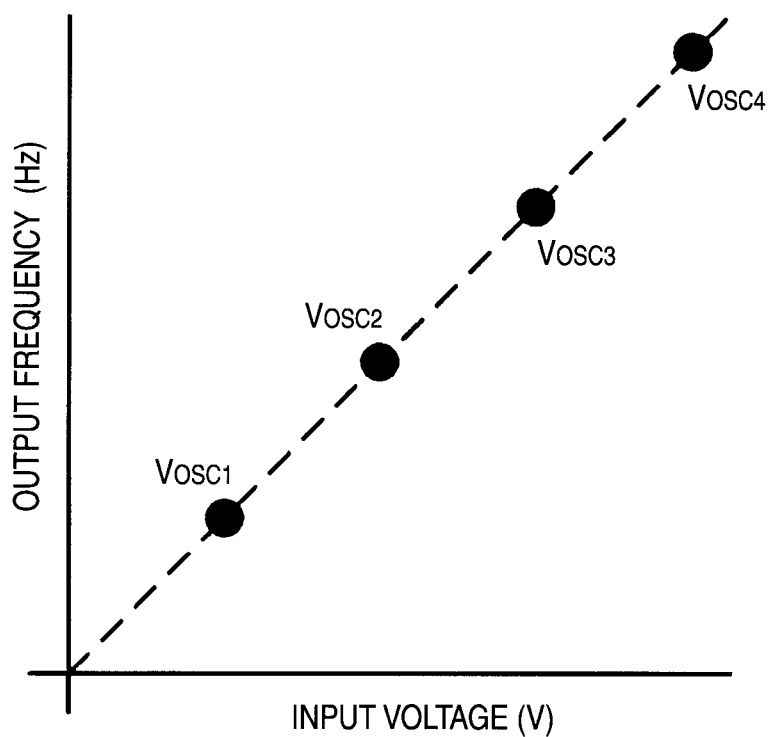
FIG. 6 is an explanatory graph showing input and output characteristics of VCO used for the charge pump circuit shown in FIG. 5.

As shown in the drawing, in the charge pump circuit of the embodiment, the comparator 103 is replaced with the AD converter 113, as well as the selection circuit 101 is replaced with a selection circuit 111 which selects four voltage values $V_{OSC1}$ to $V_{OSC4}$. FIG. 6 is an explanatory graph showing input and output characteristics of the VCO 102 in the embodiment. As shown in the drawing, output signals having frequencies in relation to the level of the control voltages $V_{OSC1}$, $V_{OSC2}$, $V_{OSC3}$, $V_{OSC4}$ are outputted.

Figure 7:
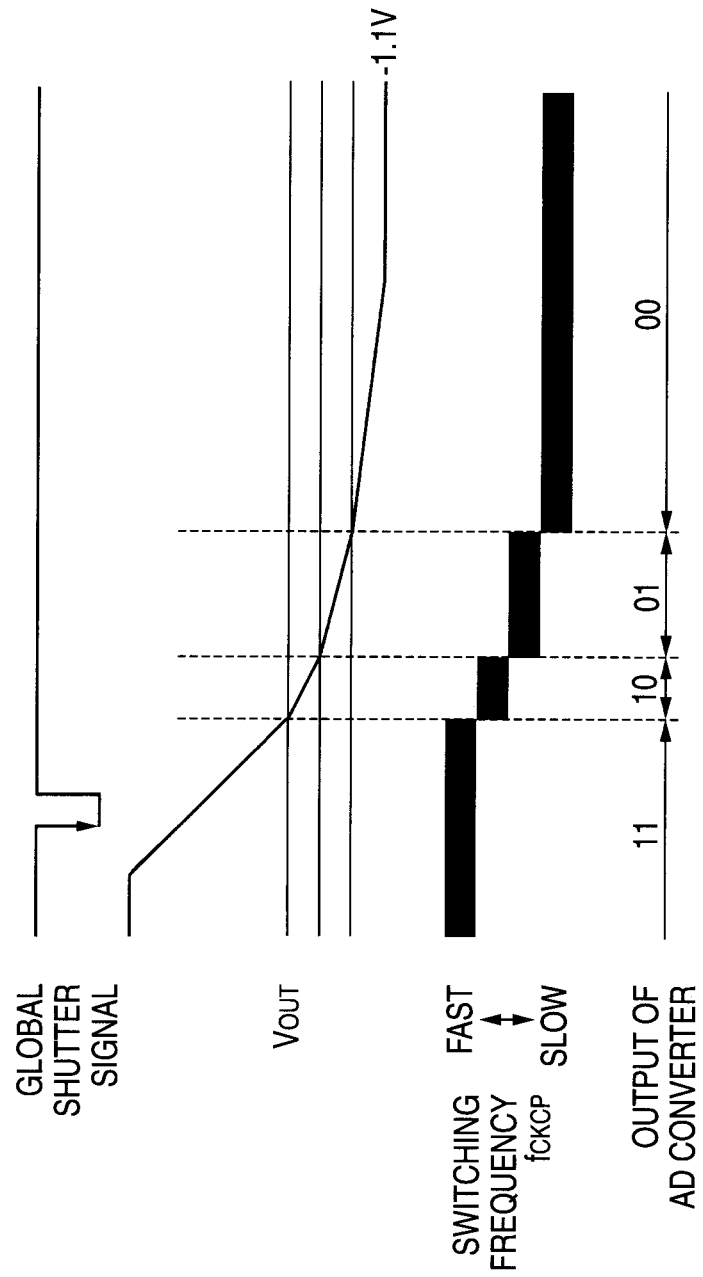
FIG. 7 is an explanatory graph showing operation of the charge pump circuit shown in FIG. 5 at the time of activation.
Figure 8:
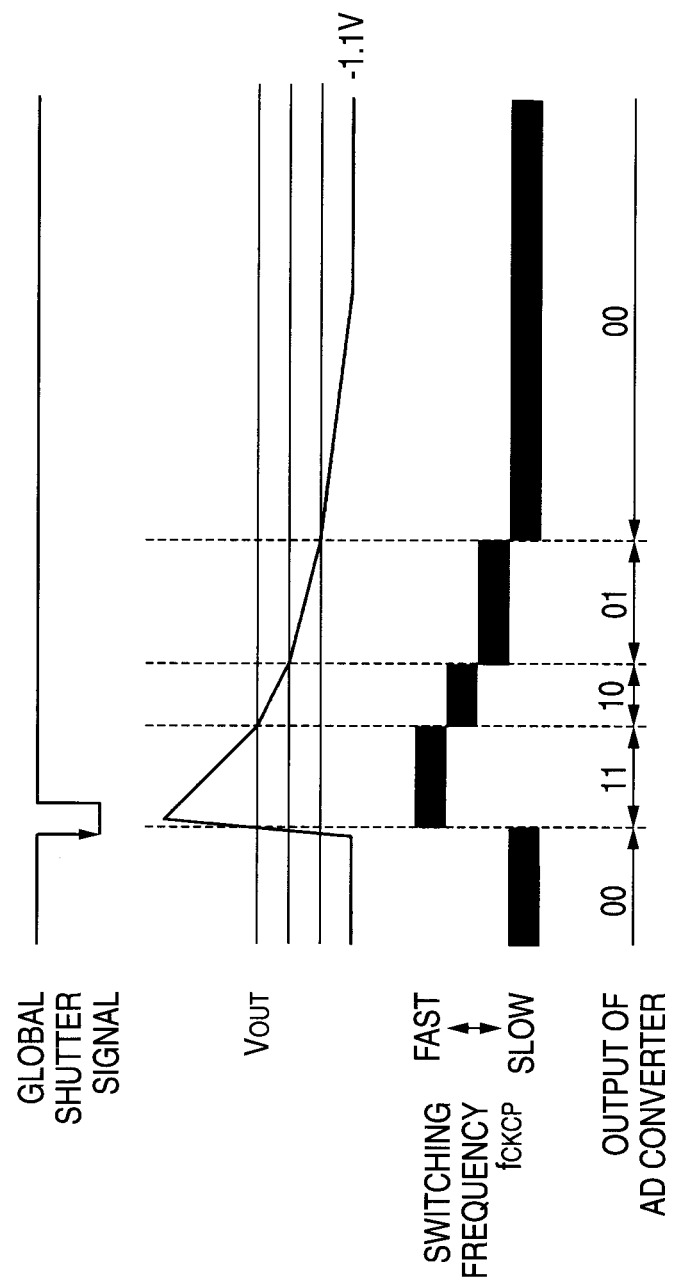
FIG. 8 is an explanatory graph showing operation of the charge pump circuit shown in FIG. 5 at the time of overload.

FIG. 7 and FIG. 8 are explanatory graphs showing operations of the embodiment. FIG. 7 shows the operation at the time of activation and FIG. 8 shows the operation at the time of overload.

According to the configuration of the embodiment, the output frequency of the VCO 102 can be multi-valued as compared with the case using the comparator 103. According to multivalued output frequency, it is possible to realize both convergence and high-speed, in which the convergence gets preference by reducing the frequency in the vicinity of a target voltage, and high-speed gets preference by increasing the frequency when the divergence to the target voltage is large.

Figure 9:
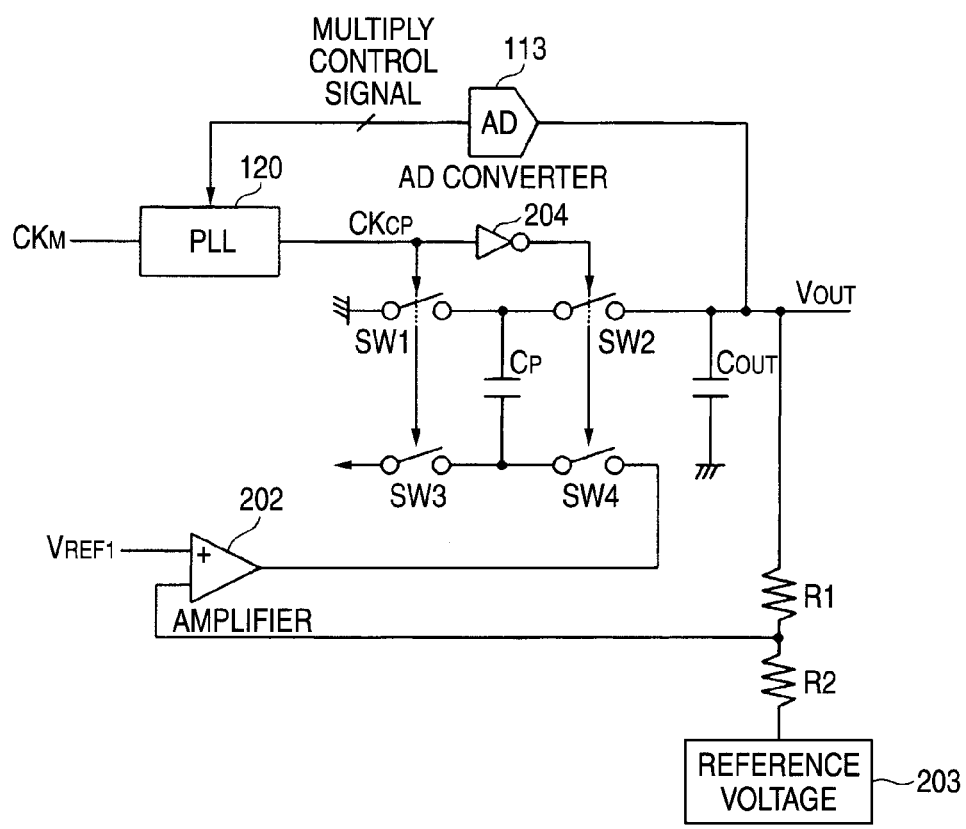
FIG. 9 is a circuit diagram showing a charge pump circuit of a solid-state imaging device according to a third embodiment of the invention.

FIG. 9 is a circuit diagram showing a third embodiment of the charge pump circuit. The whole configuration of the solid-state imaging device is the same as the configuration shown, for example, in FIG. 10, the explanation thereof is omitted. In FIG. 9, the same signs are put to components common to the embodiment shown in FIG. 5.

As shown in the drawing, in the charge pump circuit of the embodiment, the selection circuit 111 and the VCO 102 are replaced with a PLL 120, and an output frequency signal of the PLL 120 is variably controlled by a multiply control signal from the AD converter. Generally, it is necessary to correct frequency variations in the VCO due to process variations by using a particular correction method (for example, trimming and the like). The embodiment can be realized not using the particular correction since it is not necessary to use the VCO. As a result, frequency variations are reduced, thereby realizing a system in which band limitation for eliminating noise can be easily performed. In the embodiment, frequency signals generated by the PLL 120 is the same as ones shown, for example, in FIG. 6, and operations at the time of activation and at the time of overload are the same as ones shown in FIG. 7 and FIG. 8.

In the above explanation, the case in which the embodiment of the invention is applied to the MOS-type solid-state imaging device was explained, however, the invention is not limited to the MOS-type solid-state imaging device and can be applied to solid-state imaging devices such as a CCD image sensor.

The solid-state imaging device is not limited to the one in which a CMOS image sensor and the like are included on one-chip, and it is also preferable that it is a module in which an imaging unit, a signal processing unit and an optical system are integrally packaged. In addition, the device can be used in a camera system and a cellular phone. In the embodiments of the invention, the configuration including the function of the CMOS image sensor by itself is called as the solid-state imaging device and the configuration in which the solid-state imaging device and other elements (a control circuit, an operation unit, a display unit, a data storage function, a communication function and the like) are integrally united is called as an imaging apparatus.

Hereinafter, an imaging apparatus to which an embodiment of the invention is applied will be explained.

Figure 18:
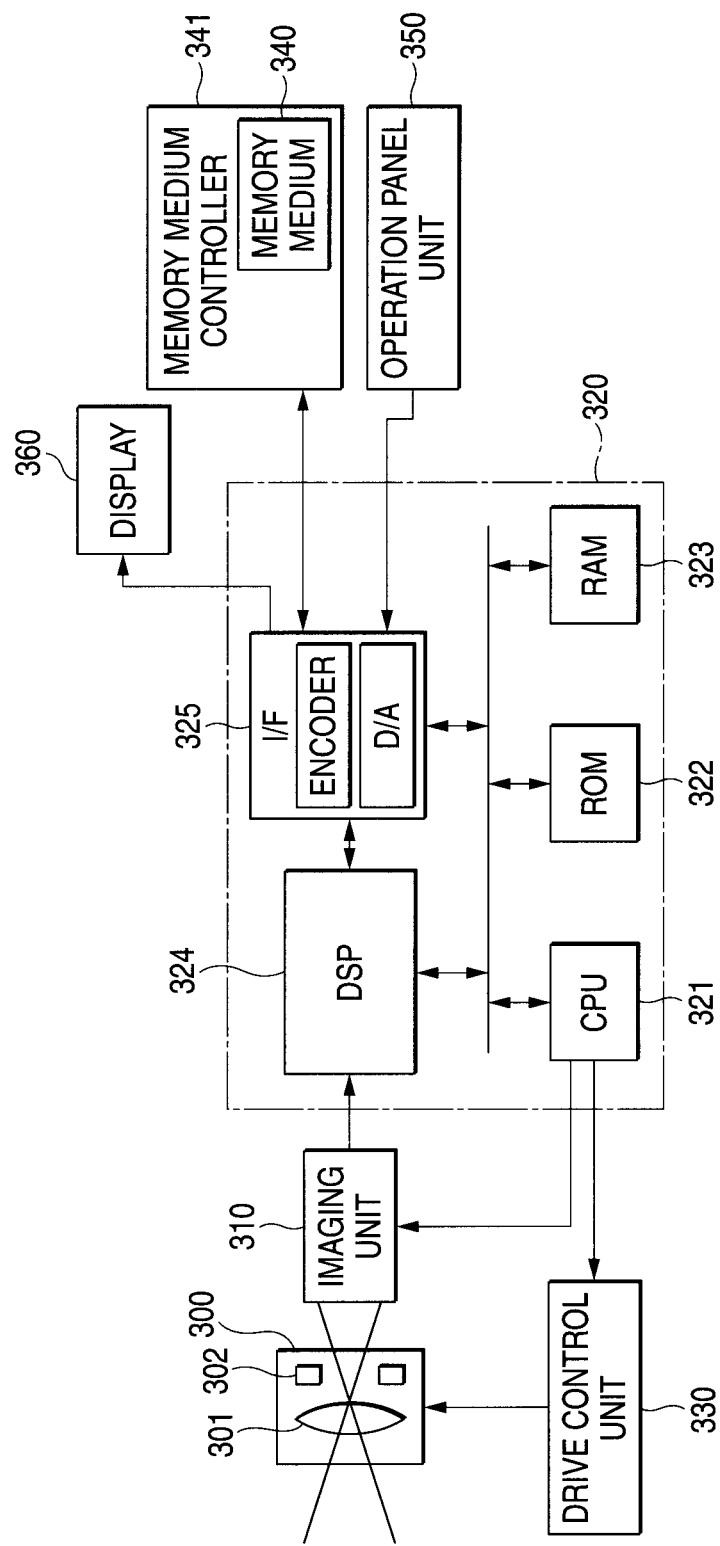
FIG. 18 is a block diagram showing a configuration example of a camera apparatus using the solid-state imaging device according to an embodiment of the invention.

FIG. 18 is a block diagram showing a configuration example of a camera apparatus using the CMOS image sensor of the embodiment.

In FIG. 18, an imaging unit 310 takes images of subjects by using, for example, the CMOS image sensor explained in the above embodiments, outputting imaging signals to a system control unit 320 mounted on a main substrate.

The imaging unit 310 generates and outputs digital imaging signals by performing AGC (Automatic Gain Control), OB (Optical Black) clamp, CDS (correlated double sampling), A/D conversion and the like to the output signals of the CMOS image sensor.

In the embodiment, an example in which imaging signals are converted to digital signals in the imaging unit 310 and outputted to the system control unit 320 is shown, however, it is also preferable to apply a configuration in which analog imaging signals are transmitted from the imaging unit 310 to the system control unit 320, and the signals are converted to the digital signals at the side of the system control unit 320.

Specific control operations, signal processing and the like in the imaging unit 310 are provided in various manners from the past, and it goes without saying that they are not particularly limited in the imaging apparatus according to the embodiment of the invention.

An imaging optical system 300 includes a zoom lens 301 arranged in a lens barrel, a diaphragm mechanism 302 and the like, focusing subject images at light receiving portions of the CMOS image sensor, which drives respective units mechanically by control of a drive control unit 330 based on instructions of the system control unit 320 to perform control such as automatic focusing and the like.

The system control unit 320 is provided with a CPU 321, a ROM 321, a RAM 323, a DSP 324, an external interface 325 and the like.

The CPU 321 transmits instructions to respective units of the camera apparatus by using the ROM 322 and the RAM 323 to control the whole system.

The DSP 324 generates picture signals of still pictures or moving pictures according to a prescribed format (for example, a YUV signal and the like) by performing various signal processing to imaging signals from the imaging unit 310.

The external interface 325 includes various encoders, a D/A converter and the like, transmitting and receiving various control signals or data with respect to external elements (in the embodiment, a display 360, a memory medium 340 and an operation panel unit 350) connected to the system control unit 320.

The display 360 is a small display such as a liquid-crystal panel incorporated in the camera apparatus, displaying the imaged pictures. In addition to the small display incorporated in the camera apparatus, it is possible to apply a configuration in which image data is transmitted to an external large display device to display the data.

The memory medium 340 is capable of appropriately storing taken pictures, for example, in various kinds of memory cards and the like, which can be exchanged, for example, with respect to a memory medium controller 341. As the memory medium 340, in addition to various memory cards, disc media and the like using magnetic or light can be used.

The operation panel 350 is provided with input keys for performing various instructions by the user when taking pictures by the camera apparatus. The CPU 321 monitors input signals from the operation panel unit 350 and executes various operation controls based on the inputted contents.

The embodiments of the invention are applied to the above camera apparatus, thereby providing an imaging apparatus having high quality which performs proper power supply at the time of activation of the apparatus or at the time of sudden load change and which realizes speed-up of activation operation and suppressing load change. In the above configuration, the combination of unit devices or unit modules to be components of the system or the size of setting can be selected suitably based on circumstances in commercialization of products, and the imaging apparatus according to the embodiments of the invention widely includes various modifications.

A solid-state imaging device and an imaging apparatus according to an embodiment of the invention can be applied to, as imaging objects (subjects), not only general pictures such as human beings, landscape and the like but also imaging of particular minute image patterns such as a counterfeit money detector, a fingerprint detector and the like. An apparatus configuration in this case is not the one of general camera apparatus shown in FIG. 18 but one including a further particular imaging optical system or signal processing system having pattern analysis. Also in such case, operation and effect of the invention can be exerted and accurate image detection can be realized.

In the case that a remote system is configured such as a remote medical system, an anticrime monitor, and a personal identification, it is possible to have an apparatus configuration including a communication module connected to the network, namely, wide application can be realized.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device, comprising:
a plurality of photoelectric conversion units;
a like plurality of transfer units that respectively transfer signal charges generated in the photoelectric conversion units for readout;
a voltage supply circuit that supplies a negative supply voltage used in controlling the transfer units, the voltage supply circuit having a charge pump circuit with (i) a pump capacitance that pumps up charge from a voltage source and (ii) a switching circuit that performs a switching control of the charge-pump operation by the pump capacitance based on a frequency of a signal output from an oscillator, the voltage supply circuit having a feedback circuit that compares the negative supply voltage against a reference voltage and feeds back the result of the comparison to the charge pump circuit;
a detection unit that (i) detects a variation in the negative supply voltage from a target voltage value, including a variation in the negative supply voltage due to a load change occurring at the time of a shutter operation of the solid-state imaging device in a global shutter mode, and (ii) outputs a signal in response to the detected voltage variation; and
a voltage control unit including the oscillator and that receives the signal output by the detection unit and that, based on the signal output by the detection unit, controls the voltage supply circuit by causing the oscillator to output a signal to the switching circuit with a frequency operative to bring the negative supply voltage to the target voltage value faster than if the detection circuit were not present, the voltage control unit bringing the negative supply voltage to the target voltage value by controlling a switching frequency of the charge pump circuit.

2. The solid-state imaging device according to claim 1, wherein the variation in the negative supply voltage from the target voltage value further includes a variation in the negative supply voltage at the time of activation of the solid-state imaging device.

3. The solid-state imaging device according to claim 1, wherein the voltage control unit includes a selection circuit switching control signals which control the switching frequency of the charge pump circuit.

4. The solid-state imaging device according to claim 1, wherein the detection unit is a comparator which compares the negative supply voltage with a second reference voltage.

5. The solid-state imaging device according to claim 1, wherein the load change is due to a change in a capacitance load during the global shutter mode.

6. The solid-state imaging device according to claim 2, wherein the activation of the solid-state imaging device includes at least one of: (i) a switch-on of the solid-state imaging device and (ii) a return of the solid-state imaging device from a standby state.

7. An imaging apparatus, comprising:
(1) a solid-state imaging device for performing imaging of subjects, the solid-state imaging device including:
 (a) a plurality of photoelectric conversion units,
 (b) a like plurality of transfer units that respectively transfer signal charges generated in the photoelectric conversion units for readout,
 (c) a voltage supply circuit that supplies a negative supply voltage used in controlling the transfer units, the voltage supply circuit having a charge pump circuit with (i) a pump capacitance that pumps up charge from a voltage source and (ii) a switching circuit that performs a switching control of the charge-pump operation by the pump capacitance based on a frequency of a signal output from an oscillator, the voltage supply circuit having a feedback circuit that compares the negative supply voltage against a reference voltage and feeds back the result of the comparison to the charge pump circuit,
 (d) a detection unit that (i) detects a variation in the negative supply voltage from a target voltage value, including a variation in the negative supply voltage due to a load change occurring at the time of a shutter operation of the solid-state imaging device in a global shutter mode, and (ii) outputs a signal in response to the detected voltage variation, and
 (e) a voltage control unit including the oscillator and that receives the signal output by the detection unit and that, based on the signal output by the detection unit, controls the voltage supply circuit by causing the oscillator to output a signal to the switching circuit with a frequency operative to bring the negative supply voltage to the target voltage value faster than if the detection circuit were not present, the voltage control unit bringing the negative supply voltage to the target voltage value by controlling a switching frequency of the charge pump circuit;
(2) an imaging optical system focusing subject images at light receiving portions of the solid-state imaging device;
(3) a drive control unit that drives the imaging optical system;
(4) a signal processing unit performing signal processing of output signals from the solid-state imaging device and generating imaging signals;
(5) a recording unit that records the imaging signals generated by the signal processing unit;
(6) an output unit that outputs the imaging signals generated by the signal processing unit; and
(7) an operation unit that inputs various signals for controlling imaging operations.

8. The imaging apparatus according to claim 7, wherein the variation in the negative supply voltage from the target voltage value further includes a variation in the negative supply voltage at the time of activation of the solid-state imaging device.

9. The imaging apparatus according to claim 7, wherein the voltage control unit includes a selection circuit switching control signals which control the switching frequency of the charge pump circuit.

10. The imaging apparatus according to claim 7, wherein the detection unit is a comparator which compares the negative supply voltage with a second reference voltage.

11. The imaging apparatus according to claim 7, wherein the load change is due to a change in a capacitance load during the global shutter mode.

12. The imaging apparatus according to claim 8, wherein the activation of the solid-state imaging device includes at least one of: (i) a switch-on of the solid-state imaging device and (ii) a return of the solid-state imaging device from a standby state.

* * * * *